US012678863B2

(12) United States Patent
Kawashima

(10) Patent No.: US 12,678,863 B2
(45) Date of Patent: Jul. 14, 2026

(54) CUTTING INSERT, ROTARY TOOL, AND METHOD FOR MANUFACTURING MACHINED PRODUCT

(71) Applicant: KYOCERA CORPORATION, Kyoto (JP)

(72) Inventor: Kouji Kawashima, Kusatsu (JP)

(73) Assignee: KYOCERA CORPORATION, Kyoto (JP)

( * ) Notice: Subject to any disclaimer, the term of this patent is extended or adjusted under 35 U.S.C. 154(b) by 637 days.

(21) Appl. No.: 18/042,289

(22) PCT Filed: Aug. 20, 2021

(86) PCT No.: PCT/JP2021/030562
§ 371 (c)(1),
(2) Date: Feb. 20, 2023

(87) PCT Pub. No.: WO2022/039258
PCT Pub. Date: Feb. 24, 2022

(65) Prior Publication Data
US 2023/0321733 A1      Oct. 12, 2023

(30) Foreign Application Priority Data
Aug. 21, 2020      (JP) ................................. 2020-140376

(51) Int. Cl.
*B23B 51/06*            (2006.01)
*B23B 27/16*            (2006.01)
*B23B 51/00*            (2006.01)

(52) U.S. Cl.
CPC ........ *B23B 27/1611* (2013.01); *B23B 51/068* (2022.01); *B23B 51/0005* (2022.01)

(58) Field of Classification Search
CPC ....... B23B 51/00; B23B 51/042; B23B 51/06; B23B 51/068; B23B 51/0002; B23B 51/0003; B23B 51/00035; B23B 2250/12; B23C 5/28; B23C 5/282; B23C 2250/12
See application file for complete search history.

(56) References Cited

U.S. PATENT DOCUMENTS

| | | | |
|---|---|---|---|
| 6,595,727 B2 * | 7/2003 | Arvidsson | ............... B23C 5/006 407/43 |
| 7,036,539 B2 * | 5/2006 | Sherman | .................. B27G 3/00 407/56 |
| 9,902,002 B2 * | 2/2018 | Ning | .................... B23D 77/006 |

(Continued)

FOREIGN PATENT DOCUMENTS

| | | | | |
|---|---|---|---|---|
| CN | 102378662 A | * | 3/2012 | ......... B23B 31/1122 |
| JP | 2009541072 A | | 11/2009 | |

(Continued)

*Primary Examiner* — Nicole N Ramos
(74) *Attorney, Agent, or Firm* — HAUPTMAN HAM, LLP

(57) ABSTRACT

An insert includes a cutting portion and a shaft portion. The cutting portion includes: a cutting edge that is located on a side of a first end; an end surface that is located on a side of the side of a second end; and a first through hole extending from the end surface toward the first end. The first through hole includes: a first opening that is located on the side of the first end; and a second opening located on the side of the second end. The first opening is positioned in the rear of the second opening in a rotational direction of the rotational axis.

14 Claims, 17 Drawing Sheets

(56)          References Cited

U.S. PATENT DOCUMENTS

| | | | |
|---|---|---|---|
| 10,799,958 B2 * | 10/2020 | Wacinski ................ | B23B 51/02 |
| 2009/0283975 A1 | 11/2009 | Kretzschmann et al. | |
| 2011/0036225 A1 | 2/2011 | Krenzer | |
| 2012/0121344 A1 | 5/2012 | Schuffenhauer et al. | |
| 2014/0255116 A1 | 9/2014 | Myers et al. | |
| 2016/0263663 A1 * | 9/2016 | Schwaegerl .............. | B24B 3/26 |

FOREIGN PATENT DOCUMENTS

| | | | | |
|---|---|---|---|---|
| JP | 2011504810 A | 2/2011 | | |
| JP | 2012520180 A | 9/2012 | | |
| JP | 2014172167 A | 9/2014 | | |
| WO | WO-2018162185 A1 * | 9/2018 | ............. | B23B 51/06 |

* cited by examiner

CUTTING INSERT, ROTARY TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2021/030562 filed on Aug. 20, 2021, which claims priority to Japanese Patent Application No. 2020-140376, filed on Aug. 21, 2020.

TECHNICAL FIELD

The present disclosure relates to a cutting insert used in machining for a workpiece, a rotary tool, and a method for manufacturing a machined product.

BACKGROUND OF INVENTION

A drill and the like are known as a rotary tool that rotates to perform machining on a workpiece such as metal. A cutting insert used in the rotary tool has a distal end surface where a through hole opens (see, for example, Patent Documents 1 and 2). A coolant can flow through the through hole.

CITATION LIST

Patent Literature

Patent Document 1: JP 2011-504810 T
Patent Document 2: JP 2014-172167 A

SUMMARY

In one aspect of the present disclosure, a cutting insert extends from a first end to a second end along a rotational axis. The cutting insert includes: a cutting portion located on a side of the first end; and a shaft portion located on a side of the second end. The cutting portion includes: a cutting edge located on the side of the first end; an end surface located on the side of the second end; and a first through hole extending from the end surface toward the first end. The shaft portion extends from the end surface to the second end. The first through hole includes: a first opening located on the side of the first end; and a second opening located on the side of the second end. The first opening is positioned in the rear of the second opening in a direction of rotation about the rotational axis.

DESCRIPTION OF EMBODIMENTS

Figure 1:
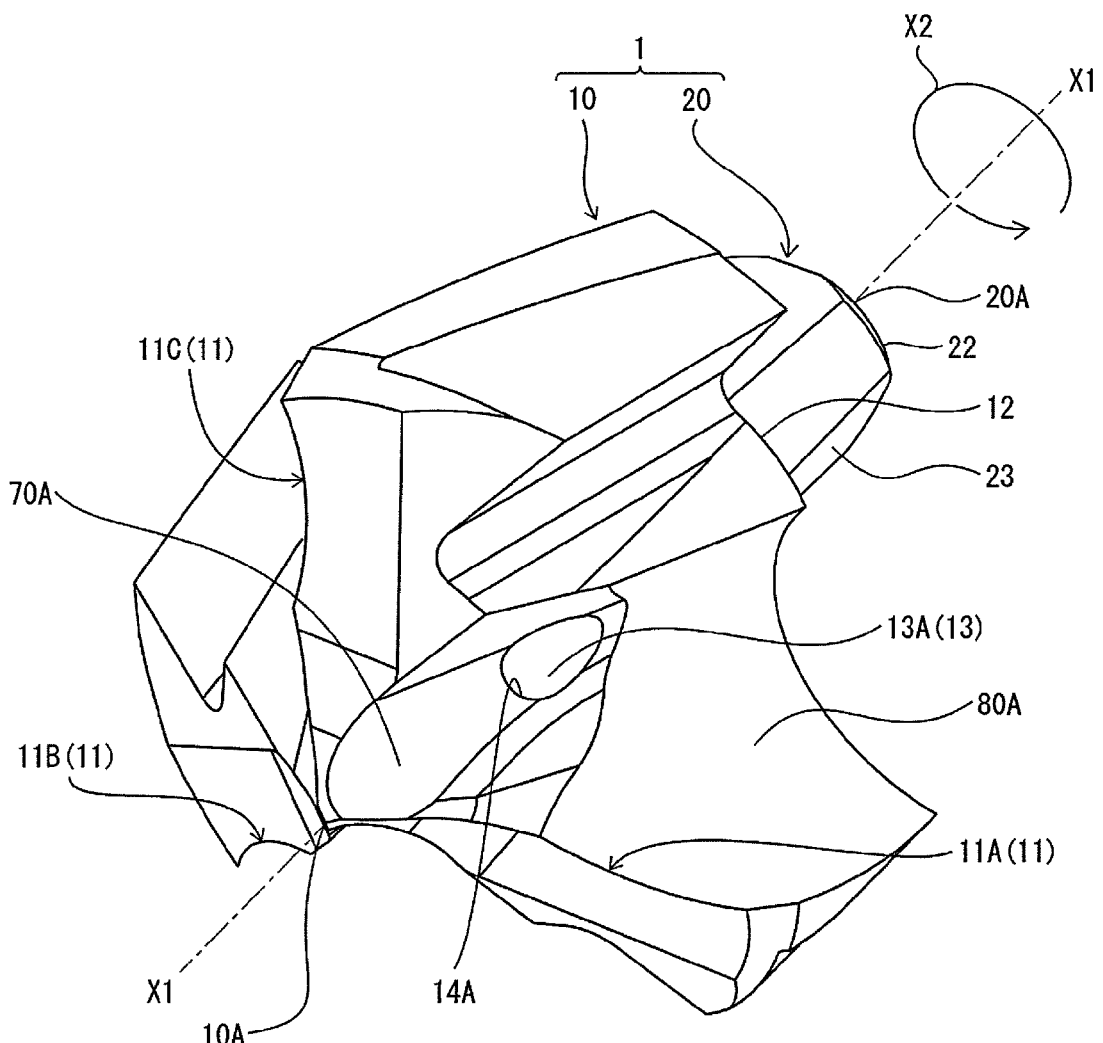
FIG. 1 is a perspective view of a cutting insert according to a non-limiting embodiment of the present disclosure.

Detailed description will be given below of a cutting insert (hereinafter, also simply referred to as an insert), a rotary tool, and a method for manufacturing a machined product of a non-limiting embodiment of the present disclosure with reference to the diagrams. However, for convenience of explanation, each of the drawings referenced below is simplified to illustrate only the main members necessary to describe the embodiment. Accordingly, the insert and the rotary tool may be provided with any constituent member that is not illustrated in each of the drawings referenced in this specification. The dimensions of the members in the drawings do not faithfully represent the actual dimensions of the constituent members, the dimension ratios of the members, or the like.

1. Overview of Insert

Figure 2:
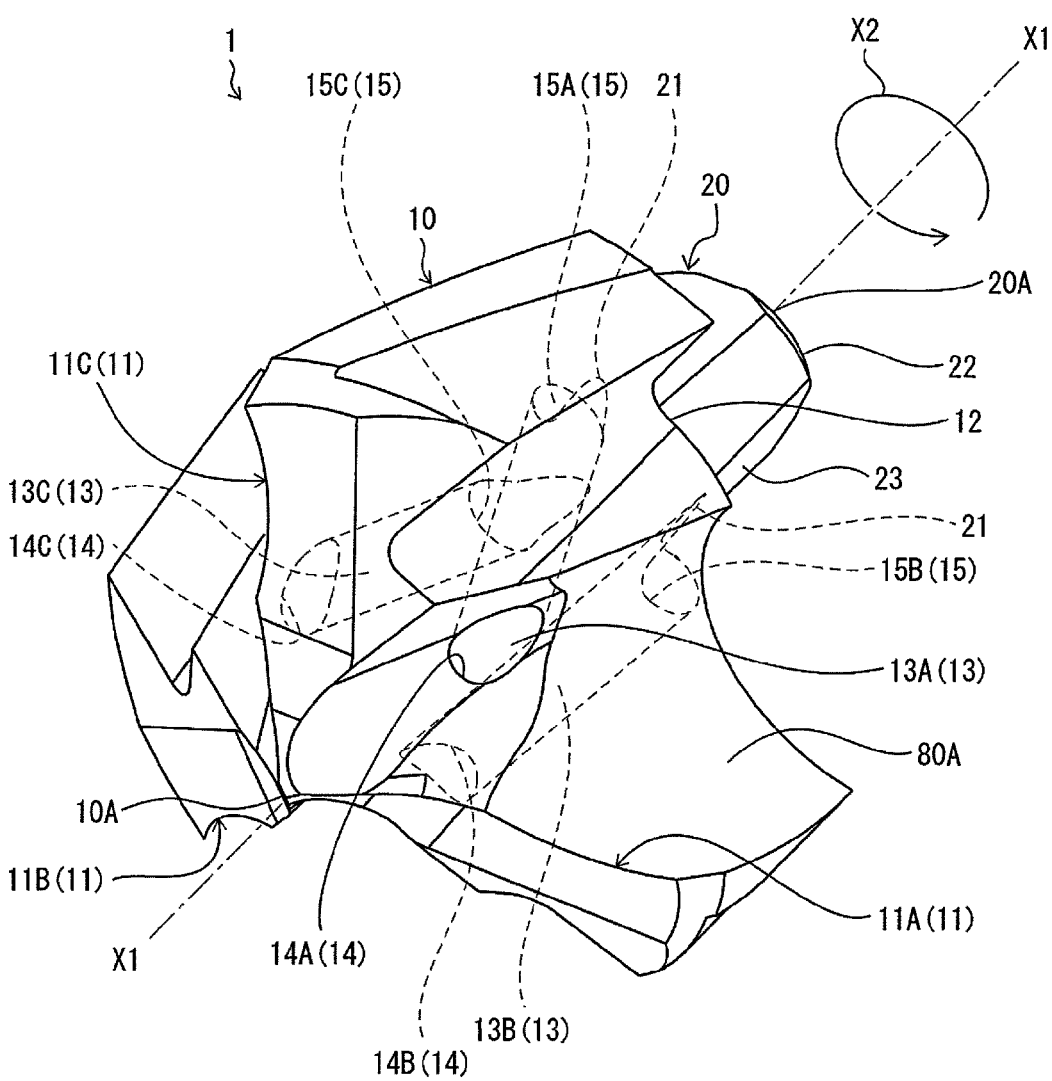
FIG. 2 is a perspective view of the cutting insert illustrated in FIG. 1, in which three first through holes and a first groove are illustrated in dashed lines.
Figure 3:
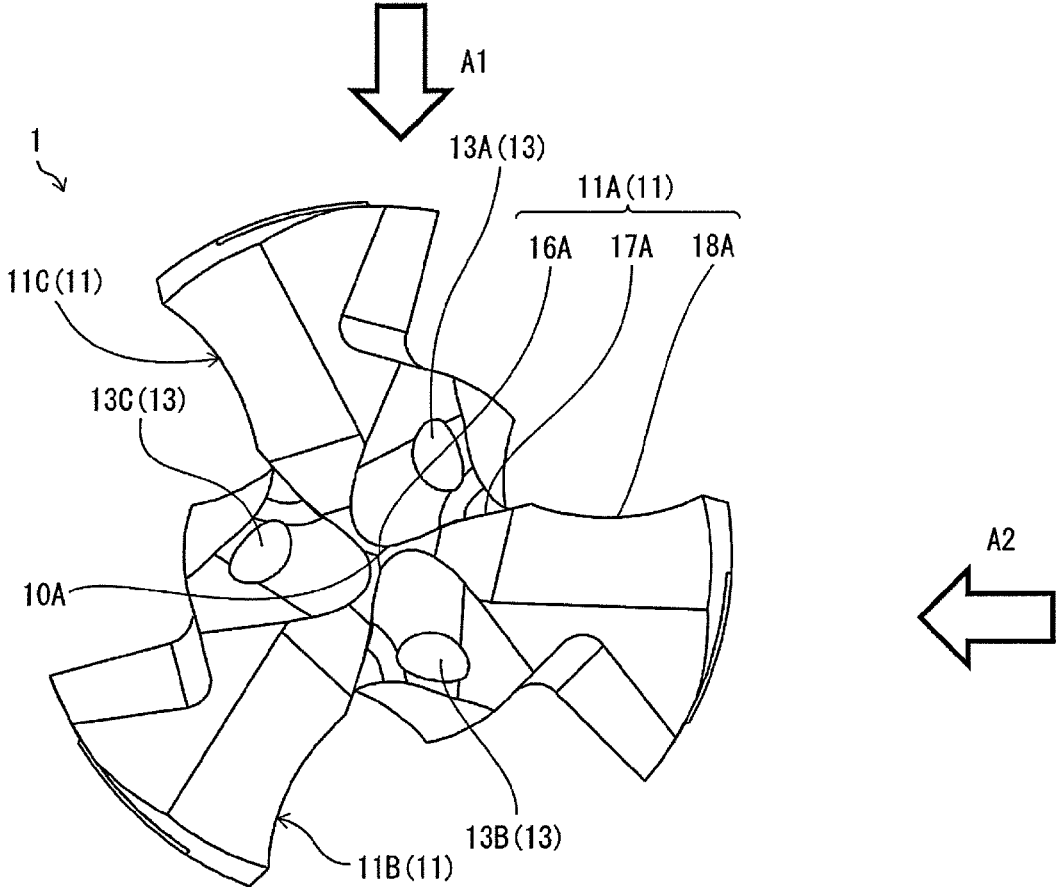
FIG. 3 is a front view of the cutting insert illustrated in FIG. 1 as viewed from a side of a first end.
Figure 4:
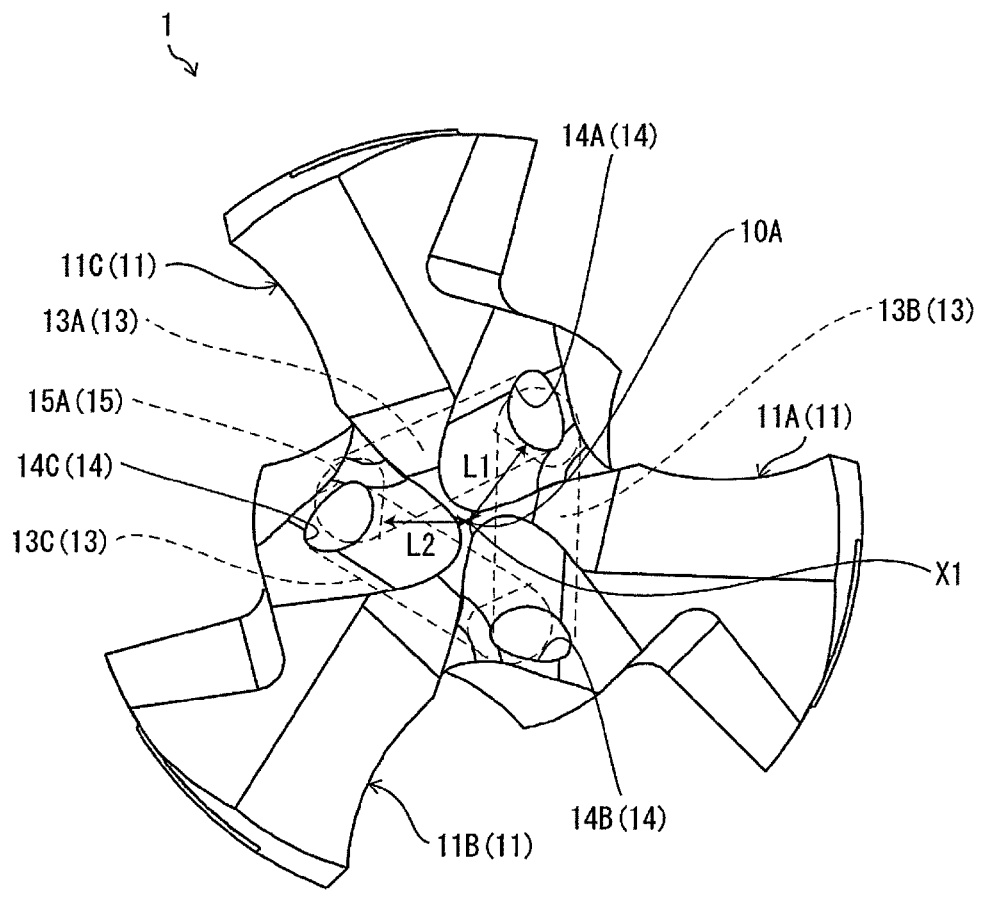
FIG. 4 is a front view of the cutting insert illustrated in FIG. 3, in which the three first through holes and the first groove are illustrated in dashed lines.
Figure 5:
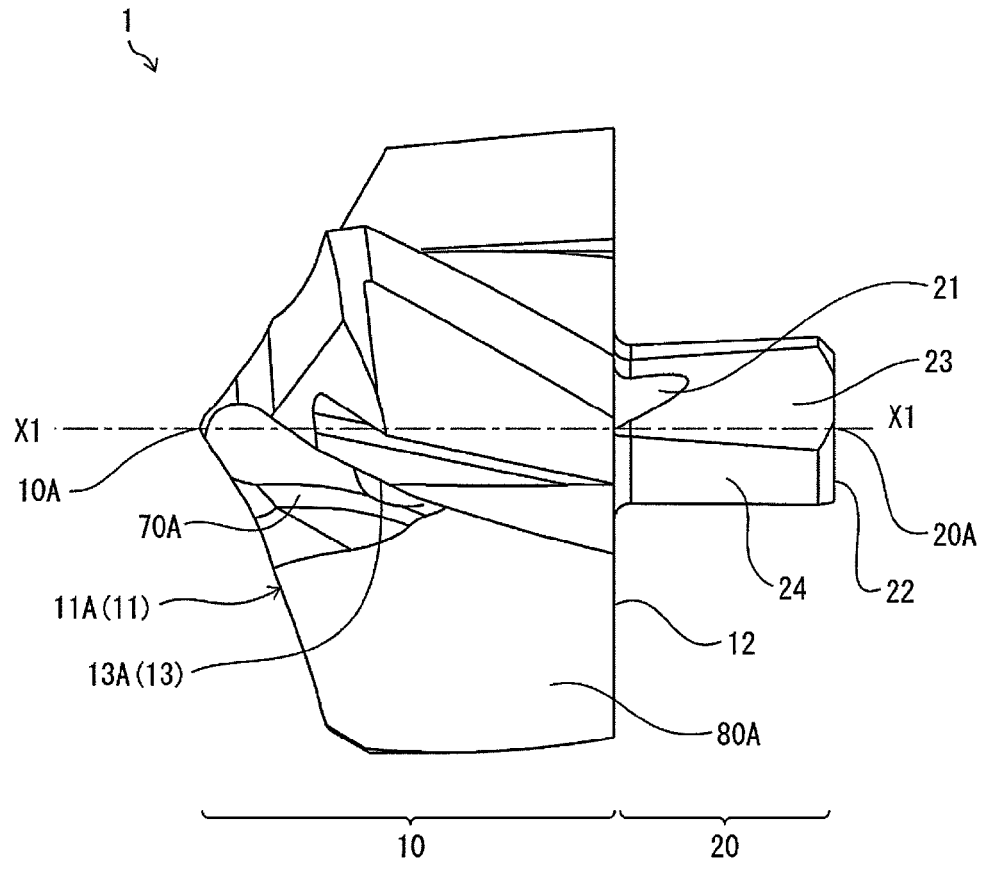
FIG. 5 is a side view of the cutting insert illustrated in FIG. 1 as viewed in an A1 direction in FIG. 3.
Figure 6:
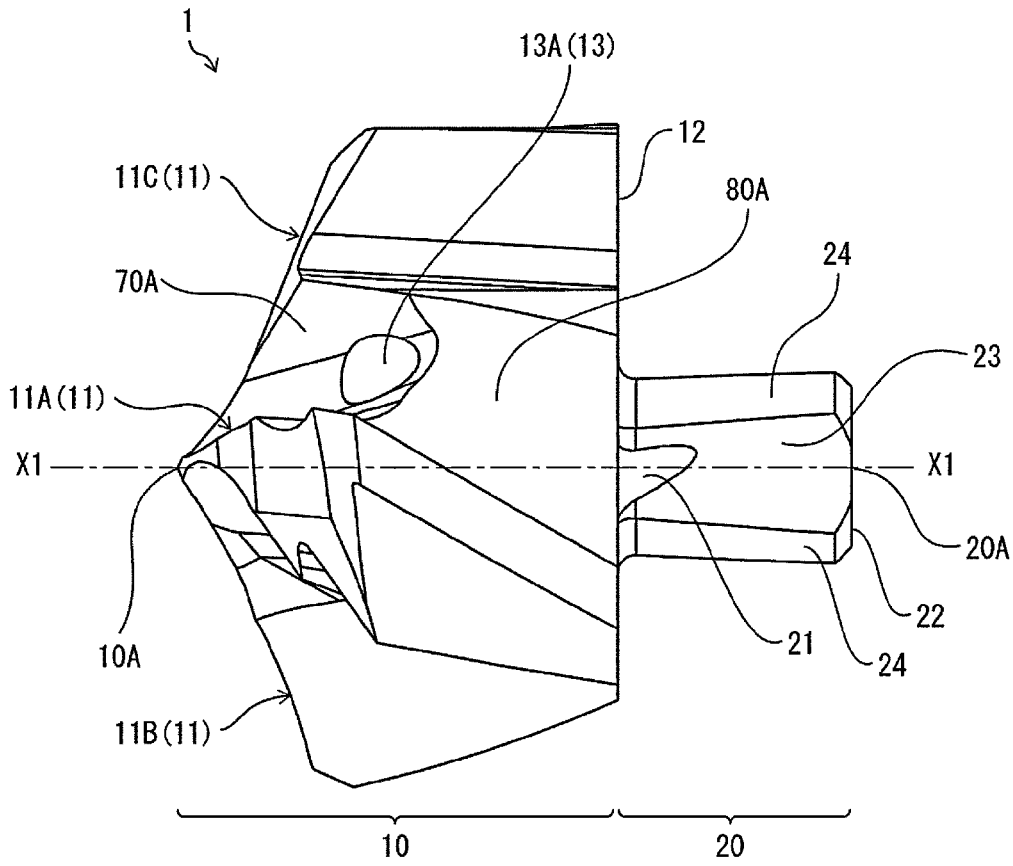
FIG. 6 is a side view of the cutting insert illustrated in FIG. 1 as viewed in an A2 direction in FIG. 3.
Figure 7:
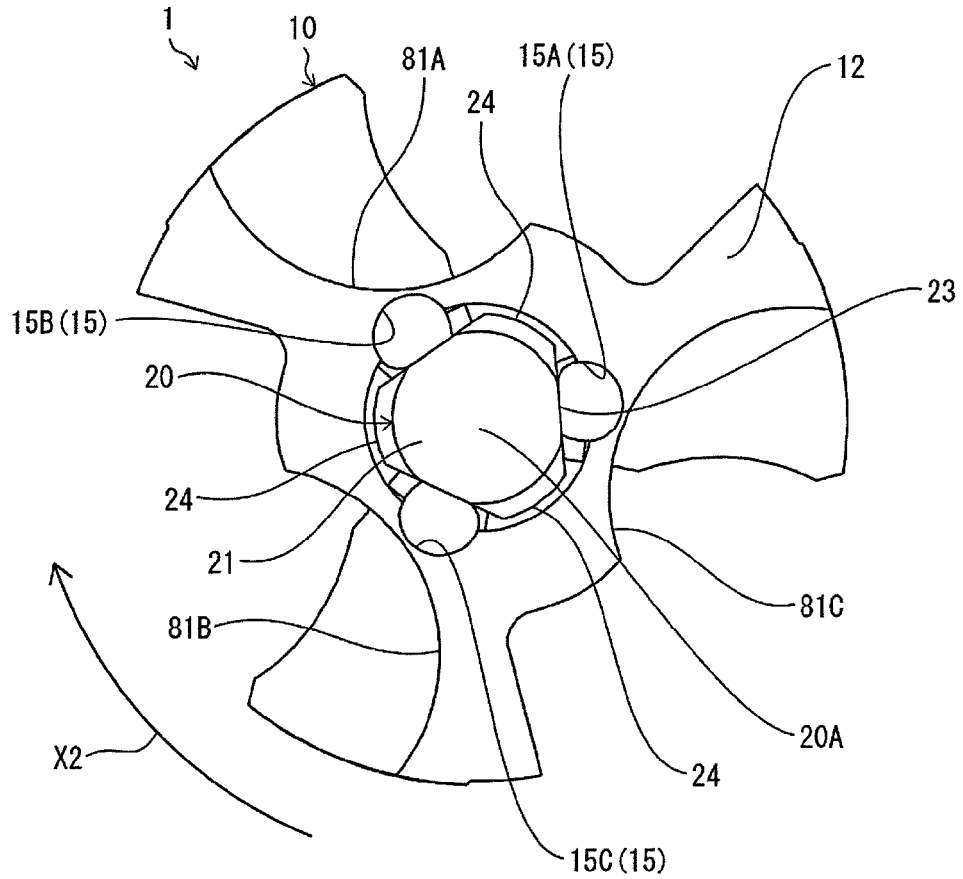
FIG. 7 is a back view of the cutting insert illustrated in FIG. 1 as viewed from a side of a second end.

First, an overview of an insert 1 of an embodiment is described with reference to FIGS. 1 to 7. FIG. 1 is a perspective view of the insert 1. FIG. 2 is a perspective view of the insert 1 illustrated in FIG. 1 in which a first through hole 13 and a first groove 21 of the insert 1 are indicated by dashed lines. FIG. 3 is a front view of the insert 1 as viewed from a side of a first end 10A. FIG. 4 is a front view of the insert 1 illustrated in FIG. 3 in which the first through hole 13 is indicated by a dashed line. FIG. 5 is a plan view of the insert 1 as viewed in an A1 direction in FIG. 3. FIG. 6 is a side view of the insert 1 as viewed in an A2 direction in FIG. 3. FIG. 7 is a back view of the insert 1 as viewed from a side of a second end 20A.

As illustrated in FIGS. 1 to 7, the insert 1 extends from a first end 10A of the insert 1 to a second end 20A of the insert 1 along a rotational axis X1, and includes a cutting portion located on the side of the first end 10A and a shaft portion 20 located on the side of the second end 20A.

The shaft portion 20 extends along the rotational axis X1. The shaft portion 20 may be used as a portion held by a holder 102 described below, by being fit and fixed in a pocket 120 provided to the holder 102, when the insert 1 is attached to the holder 102 (see FIG. 8 to FIG. 12 and the like).

The cutting portion 10 is a portion that comes into contact with a workpiece T that is a process target (see FIG. 17) in machining (drilling) described below and is a portion that plays a main role in the machining.

The insert 1 is capable of rotating about the rotational axis X1 when cutting the workpiece. An arrow X2 illustrated in FIG. 1 and the like illustrated around the rotational axis X1 indicates the rotational direction of the insert 1. An end portion (that is, the leading end of the insert 1) of the cutting portion 10 in a direction along the rotational axis X1 is referred to as the first end 10A, and an end portion (that is, the trailing end of the insert 1) of the shaft portion 20 remote from the cutting portion 10 in the direction along the rotational axis X1 is referred to as the second end 20A.

The shaft portion 20 may include a flat trailing end surface 22 including the second end 20A. The shape of the shaft portion 20 will be described in detail below. The cutting portion 10 includes an end surface 12 that is an end portion located on the side of the second end 20A. The end surface 12 is a surface to be in contact with an end surface 130 of the holder 102 located on a side of the leading end where the pocket 120 (see FIG. 12) is provided, when the insert 1 is attached to the holder 102 (see FIG. 8 and the like).

Note that, in the present specification, the description of "flat" or "flat surface" intends to mean that the surface is not a curved surface at a visible level or does not have unevenness at a visible level. Thus, for a surface referred to as being "flat" or "flat surface", an unavoidable degree of unevenness may be allowed in the manufacture of insert 1. Specifically, unevenness with a surface roughness of about 50 μm may be allowed for example. The "rotational axis" can also be expressed as a straight line (center line, center axis) passing through (i) the first end 10A and (ii) the center or substantially the center of the trailing end surface 22 of the shaft portion 20.

The size of the shaft portion 20 is not particularly limited, and the maximum width of the shaft portion 20 in a direction orthogonal to the rotational axis X1 may be set to, for example, about 3 to 10 mm. The dimension of the shaft portion 20 in a direction along the rotational axis X1 (longitudinal direction) may be set to from about 3 to 10 mm for example.

The size of the cutting portion 10 is also not particularly limited. A diameter of a virtual circle drawn with the rotational axis X1 being the center point to be in contact with the outer edge of the cutting portion 10 in a front view of the cutting portion 10 from the side of the first end 10A in a direction parallel to the rotational axis X1 may be set to be about 10 to 40 mm for example. The dimension of the cutting portion 10 from the first end 10A to the end surface 12 in the direction along the rotational axis X1 may be set to be about 5 to 20 mm for example.

The cutting portion 10 and the shaft portion 20 of the insert 1 may be formed individually or integrally.

2. Details of Insert

In a known cutting insert (see, for example, Patent Documents 1 and 2), a through hole is formed to be parallel to the rotational axis or to be inclined relative to the rotational axis toward a radial direction. The workpiece can be cooled with a coolant flowing out from the through hole thus formed. However, with the cutting insert described in Patent Document 1 or 2, the cooling effect for a cutting edge might be insufficient.

One aspect of the present disclosure can provide a cutting insert with which the cooling effect for the cutting edge can be improved.
Cutting Portion As illustrated in FIGS. 1 to 7, in the present example, the cutting portion 10 of the insert 1 includes three cutting edges 11 (11A, 11B, 11C) located on the side of the first end 10A and the end surface 12 located on the side of the second end 20A. The cutting portion 10 further includes three first through holes 13 (13A, 13B, 13C).

The three first through holes 13 (13A, 13B, 13C) each extend in the cutting portion from the end surface 12 toward the first end 10A. The three first through holes 13 (13A, 13B, 13C) each includes a first opening 14 (14A, 14B, 14C) located on the side of the first end 10A and a second opening 15 (15A, 15B, 15C) located on the side of the second end 20A. The three first through holes 13 (13A, 13B, 13C) each extend in the cutting portion 10 from the end surface 12 toward the side of the first end 10A, and the three first openings 14 (14A, 14B, 14C) are each positioned in a thinning surface (described below).

In the present example, the insert 1 having the three cutting edges 11 and the three first through holes 13 will be described, but the numbers of cutting edges 11 and the first through holes 13 of the insert 1 are not particularly limited. For example, the insert 1 may have two cutting edges 11, or may have four or more cutting edges 11. For example, the insert 1 may have two first through holes 13, or may have four or more first through holes 13. The number of the cutting edges 11 and the number of the first through holes 13 in the insert 1 are basically the same.

In the present example, the rotational direction of the insert 1 is, for example, a counterclockwise direction in a front view of the insert 1 from the side of the first end 10A as indicated by the arrow X2. In the insert 1 of the present example, the three cutting edges 11 are referred to as a cutting edge 11A, a cutting edge 11B, and a cutting edge 11C, in this order in a clockwise direction which is opposite to the rotational direction indicated by the arrow X2. In the insert 1 of the present example, the three first through holes 13 are referred to as a first through hole 13A, a first through hole 13B, and a first through hole 13C in this order in the clockwise direction.

In the insert 1, the three cutting edges 11 and the three first through holes 13 may be positioned to be rotationally symmetrical with respect to the rotational axis X1. In the present example, the cutting portion 10 of the insert 1 has the three cutting edges 11 and the three first through holes 13 that are positioned to be rotationally symmetrical with respect to the rotational axis X1, and are configured to be similar to each other. Detailed descriptions are given below for the cutting edge 11A of the three cutting edges 11 and the first through hole 13A of the three first through holes 13. The descriptions on the other cutting edges 11B and 11C and the other first through holes 13B and 13C are omitted.

As illustrated in FIG. 3, the cutting edge 11A includes a chisel edge 16A extending toward the outer circumference of the cutting portion 10 from the position of the rotational axis X1 (position of the first end 10A), a thinning edge 17A extending toward the outer circumference from the chisel edge 16A, and a main cutting edge 18A extending toward the outer circumference from the thinning edge 17A. The cutting portion 10 has a thinning surface 70A extending from the thinning edge 17A toward the second end 20A.

The first through hole 13A is a flow path for a coolant that is supplied from the holder and flows into the second opening 15A with the insert 1 being attached to the holder. The coolant passes through the first through hole 13A, to be ejected from the first opening 14A toward the side of the first end 10A of the insert 1. Specific examples of the coolant include, but are not limited to, water, oil, and emulsion.

In the insert 1 of the present example, the positional relationship between the first opening 14A and the second opening 15A of the first through hole 13A is as follows. Specifically, the first opening 14A is positioned in the rear of the second opening 15A in the rotational direction indicated by the arrow X2. In the present example, the rotational direction of the insert 1 is, for example, a counterclockwise direction in a front view of the insert 1 from the side of the first end 10A as indicated by the arrow X2. The first opening 14A can also be regarded as being positioned on the clockwise direction side of the second opening 15A.

In other words, in a front view of the insert 1 from the side of the first end 10A for example, the first through hole 13A is provided in such a manner that a flow path is formed in the cutting portion 10 to be inclined in the rotational direction (counterclockwise direction) of the insert 1 relative to the direction parallel to the rotational axis X1, with reference to the position of the first opening 14A. With this configuration, the coolant can be easily ejected toward the cutting edge 11 (11A) positioned in the rear of the first opening 14 (14A) in a rotational direction X2. Variation of strength of the cutting portion 10 along the circumferential direction is likely to be small. Therefore, the durability of the insert 1 is likely to be high.

The first through hole 13A and the first opening 14A are positioned on the thinning surface 70A. This configuration can achieve high chip dischargeability and high cooling efficiency. Specifically, the flow of chip flowing in a flute 80A toward the second end 20A is less interrupted when in a case where the first opening 14A is positioned on the thinning surface 70A than when the first opening 14A is positioned in the flute 80A.

A cooling effect with the coolant is higher when the first opening 14A is positioned on the thinning surface 70A, than when the first opening 14A is positioned in a flank for example, because the first opening 14A is positioned forward in relation to the cutting edge 11A in the rotational direction X2. A decrease in the strength of the cutting edge 11A due to the first through hole 13A provided is smaller when the first opening 14A is positioned on the thinning surface 70A than when the first opening 14A is positioned in a flank for example. Thus, the cutting edge 11 can have high durability.

In the insert 1 of the present example, the first opening 14A and the second opening 15B of the first through hole 13B may at least partially overlap each other in a front view (front perspective) of the insert 1 from the side of the first end 10A with the first through hole 13 being virtually seen through (see FIG. 4). In this case, since the three first through holes 13 (13A, 13B, and 13C) are provided to be rotationally symmetrical in the insert 1, the second opening 15A of the first through hole 13A is positioned to at least partially overlap the first opening 14C of the first through hole 13C in a front view (front perspective) of the insert 1 from the side of the first end 10A.

In the insert 1, the position of the first opening 14A may be farther from the rotational axis X1 than the position of the second opening 15A is, in a front view (front perspective) of the insert 1 from the side of the first end 10A. In other words, a distance L1 between the first opening 14A and the rotational axis X1 may be longer than a distance L2 between the second opening 15A and the rotational axis X1 in a front view of the insert 1 from the side of the first end 10A. The distance L1 is a length of a line that is orthogonal to the rotational axis X1 and connects part of the circumference edge of the first opening 14A close to the rotational axis X1 and the rotational axis X1. The distance L2 is a length of a line that is orthogonal to the rotational axis X1 and connects part of the circumference edge of the second opening 15A close to the rotational axis X1 and the rotational axis X1.

Machining speed is low at part of the cutting edge 11A, such as the chisel edge 16A, extending from the rotational axis X1. Thus, a large machining load is likely to be applied around the portion of the cutting edge 11A at the time of machining. Still, when the first opening 14A is relatively remote from the rotational axis X1 (when a position of the first opening 14A is relatively far from the rotational axis X1), a large thickness of the cutting portion 10 is likely to be guaranteed around the part of the cutting edge 11A, such as the chisel edge 16A, extending from the rotational axis X1. Therefore, the durability of the cutting portion 10 is high.

If the position of the first opening 14A is farther from the rotational axis X1 than the position of the second opening 15A is (that is, if L1>L2 holds), the coolant ejected from the first opening 14A is likely to flow toward the outer circumference. This facilitates cooling over a wide range of the cutting edge 11. Thus, high cooling effect can be achieved with the coolant.

In a front view of the insert 1 from the side of the first end 10A, the three first openings 14 (14A, 14B, and 14C) corresponding to the three first through holes 13A, 13B, and 13C do not need to be rotationally symmetrical about the rotational axis X1. Specifically, distances from the rotational axis X1 to the three first openings 14 (14A, 14B, and 14C) may not be the same in a front view of the insert 1 from the side of the first end 10A. For example, the distance from the rotational axis X1 to the first opening 14A may be different from the distance from the rotational axis X1 to the first opening 14B.

The configuration described above facilitates suppression of variation in cooling along the radial direction of the cutting edge 11 extending toward the outer circumference of the cutting portion 10 from the rotational axis X1. Thus, high cooling effect can be achieved with the coolant.

The cutting portion 10 includes the flute 80A extending from the main cutting edge 18A toward the second end 20A. A portion of the flute 80A along the main cutting edge 18A may function as a rake face. The flute 80A is adjacent to the thinning surface 70A. The flute 80A is a groove for improving the dischargeability of chips from the workpiece cut by the cutting edge 11A. In the insert 1 of the present example, the second opening 15B may be positioned away from a ridge 81A where the flute 80A and the end surface 12 intersect (see FIG. 7).

With the configuration described above, leakage of the coolant to the flute 80A is suppressed, meaning that the coolant can be stably ejected from the first opening 14A.

The insert 1 includes three flutes 80 (flute 80A, flute 80B, and flute 80C) respectively corresponding the three main cutting edges 18 (main cutting edge 18A, main cutting edge 18B, and main cutting edge 18C) of the three cutting edges 11. A ridge where the end surface 12 intersects the flute 80B is referred to as a ridge 81B, and a ridge where the end surface 12 intersects the flute 80C is referred to as a ridge 81C. In the insert 1 of the present example, the second opening 15A is positioned away from the ridge 81C, and the second opening 15C is positioned away from the ridge 81B. With this configuration, similarly to the above, the coolant can be stably ejected from the first opening 14B and the first opening 14C.

Shaft Portion

In the insert 1 of the present example, the shaft portion 20 may have the following shape, so as to be capable of fitting and being fixed in the pocket 120 of the holder 102 (see FIG. 12), and to enable the coolant to flow between the pocket 120 and the shaft portion 20 in this fixed state.

Specifically, the shaft portion 20 may include three flow path surfaces 23 extending in directions toward the second end 20A from the three respective second openings 15 formed in the end surface 12 of the cutting portion 10. The flow path surfaces 23 form part of the flow path of the coolant. The flow path surface 23 may be planar or substantially planar, and may have a curved surface shape recessed in the direction of the rotational axis X1.

The shaft portion 20 may include a curved surface 24 having a shape corresponding to the outer circumference surface of a cylinder between the two flow path surfaces 23. In the present example, the shaft portion 20 includes three curved surfaces 24. Generally, the shaft portion 20 may have a shape including three flow path surfaces 23 and three curved surfaces 24, formed by cutting out relatively small semi-elliptical cylinders from three portions around the outer circumference surface of a cylinder, for example. The shaft portion 20 may be chamfered between the curved surface 24 and the trailing end surface 22.

The diameter (the width in a direction orthogonal to the rotational axis X1) of the shaft portion 20 having a cylindrical shape may not necessarily be constant from the side of the first end 10A toward the side of the second end 10B. For example, as described above, the shaft portion 20 may be chamfered at an end portion of the side of the second end 10B, and may be formed a fillet at an end portion (boundary between the cutting portion 10 and the shaft portion 20) of the side of the first end 10A. The diameter of the shaft portion 20 may gradually increase from an end portion of the side of the first end 10A toward an end portion of the side of the second end 10B. In other words, the shaft portion 20 may have a frustoconical shape.

In the insert 1, the three flow path surfaces 23 may be positioned to be rotationally symmetrical with respect to the rotational axis X1. In the present example, the shaft portion 20 in the insert 1 includes the three flow path surfaces 23, but is not limited to this configuration. It suffices if the number of flow path surfaces 23 is the same as the number of first through holes 13.

The shaft portion 20 may include, on part of the flow path surfaces 23, the first groove 21 extending in a direction from the first through hole 13A toward the second end 20A. The first groove 21 may be parallel to the first through hole 13A. Typically, the first groove 21 is formed by bringing a tool used in a drilling for forming the first through hole 13 in a manufacturing process for the cutting portion 10, into contact with part of the flow path surface 23.

When the shaft portion 20 includes the first groove 21, the coolant can smoothly flow into the first through hole 13A from the flow path (flow path surfaces 23) in the shaft portion 20. In particular, when the first groove 21 extends parallel to or substantially parallel to the first through hole 13A, the coolant can even more smoothly flow into the first through hole 13A.

3. Configuration of Rotary Tool

Next, a rotary tool 100 of one example of the present disclosure will be described with reference to FIGS. 8 to 16.

Figure 8:
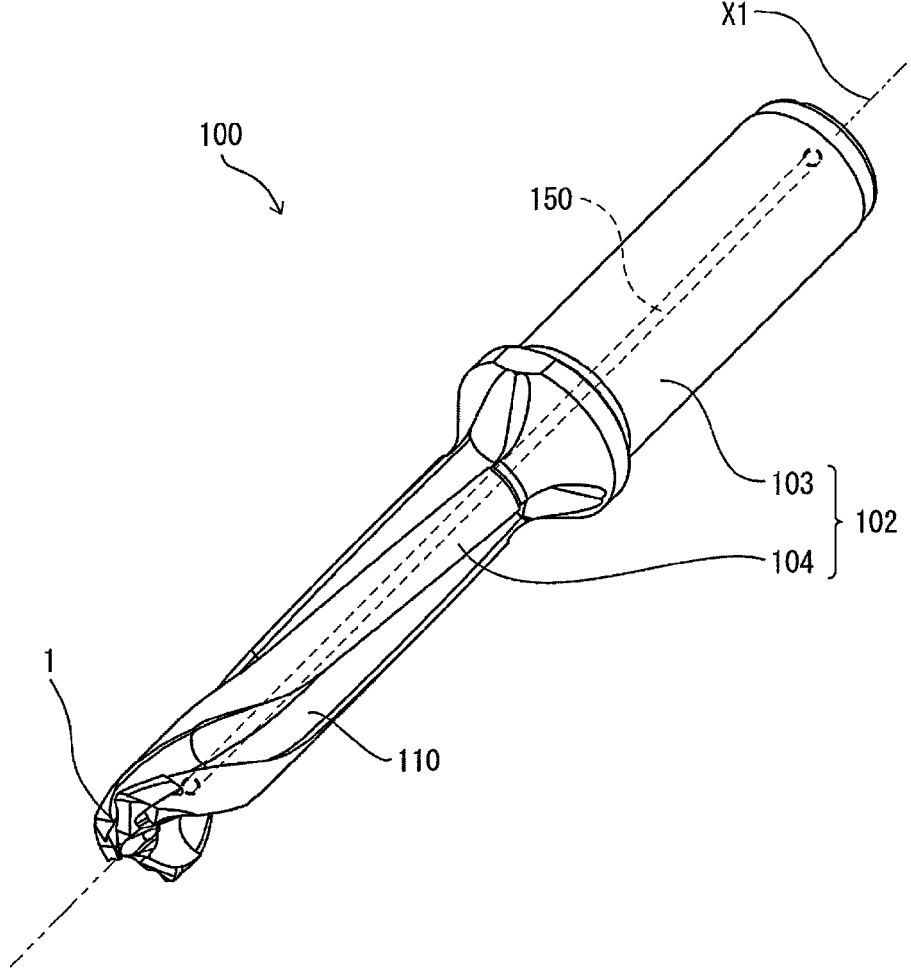
FIG. 8 is a side view illustrating a rotary tool of a non-limiting embodiment of the present disclosure.
Figure 9:
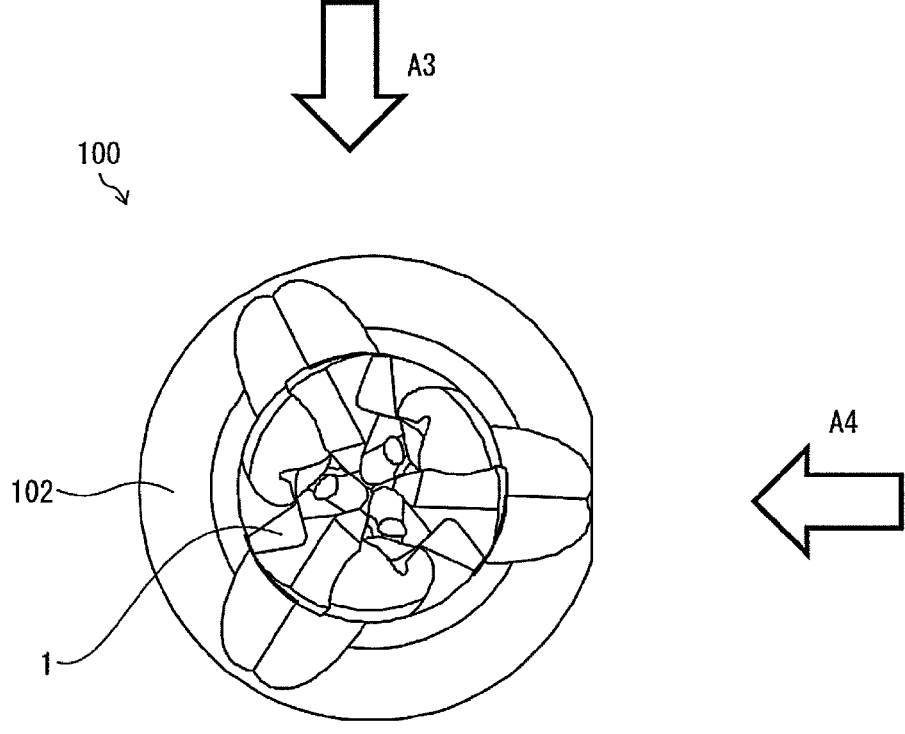
FIG. 9 is a front view of the rotary tool illustrated in FIG. 8 as viewed from a side of a first end.
Figure 10:
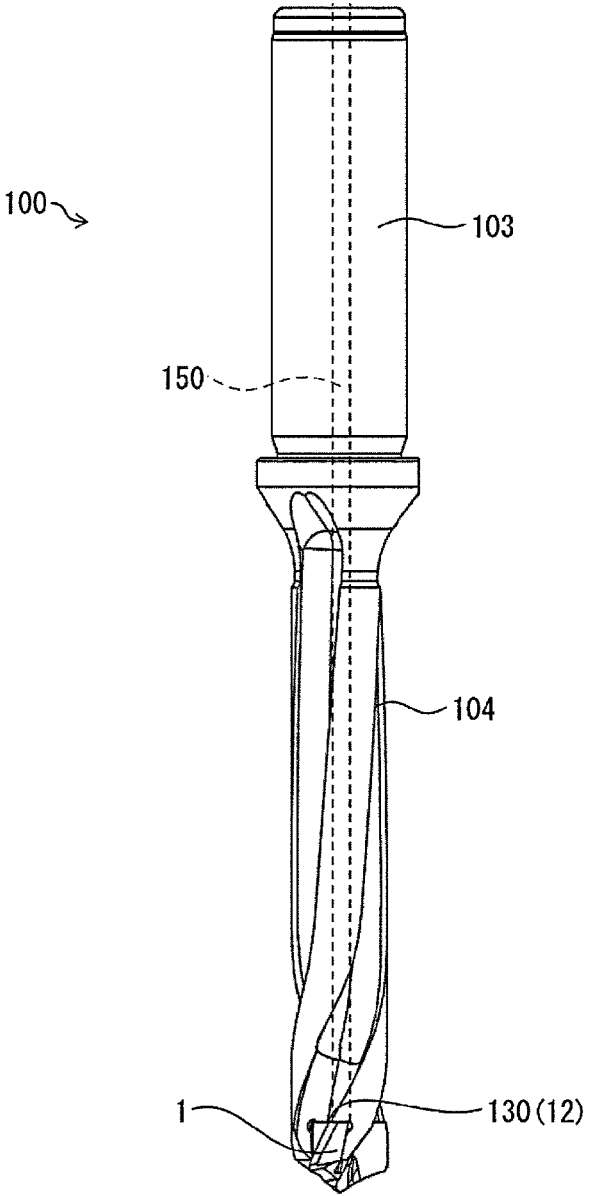
FIG. 10 is a side view of the rotary tool illustrated in FIG. 8 as viewed in an A3 direction in FIG. 9.
Figure 11:
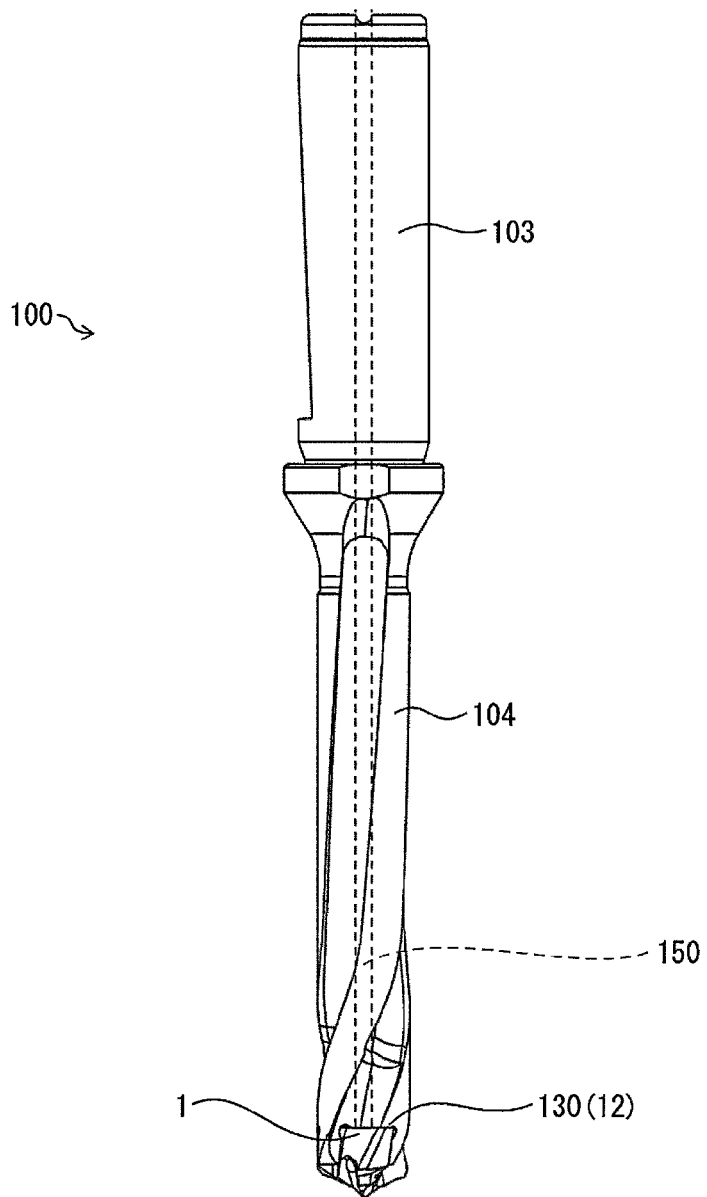
FIG. 11 is a side view of the rotary tool illustrated in FIG. 8 as viewed in an A4 direction in FIG. 9.
Figure 12:
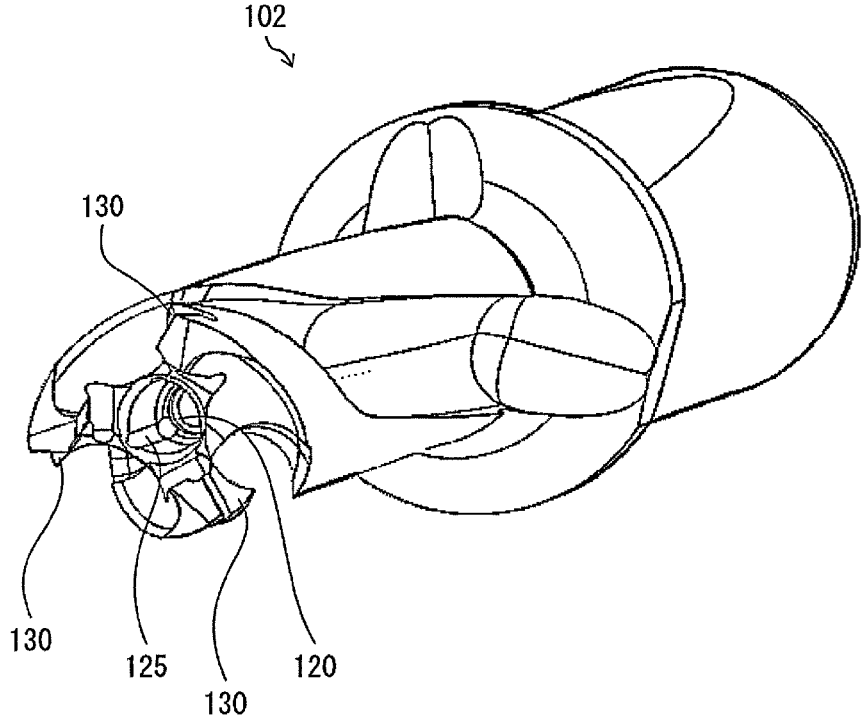
FIG. 12 is a perspective view illustrating a holder of a non-limiting embodiment of the present disclosure.
Figure 13:
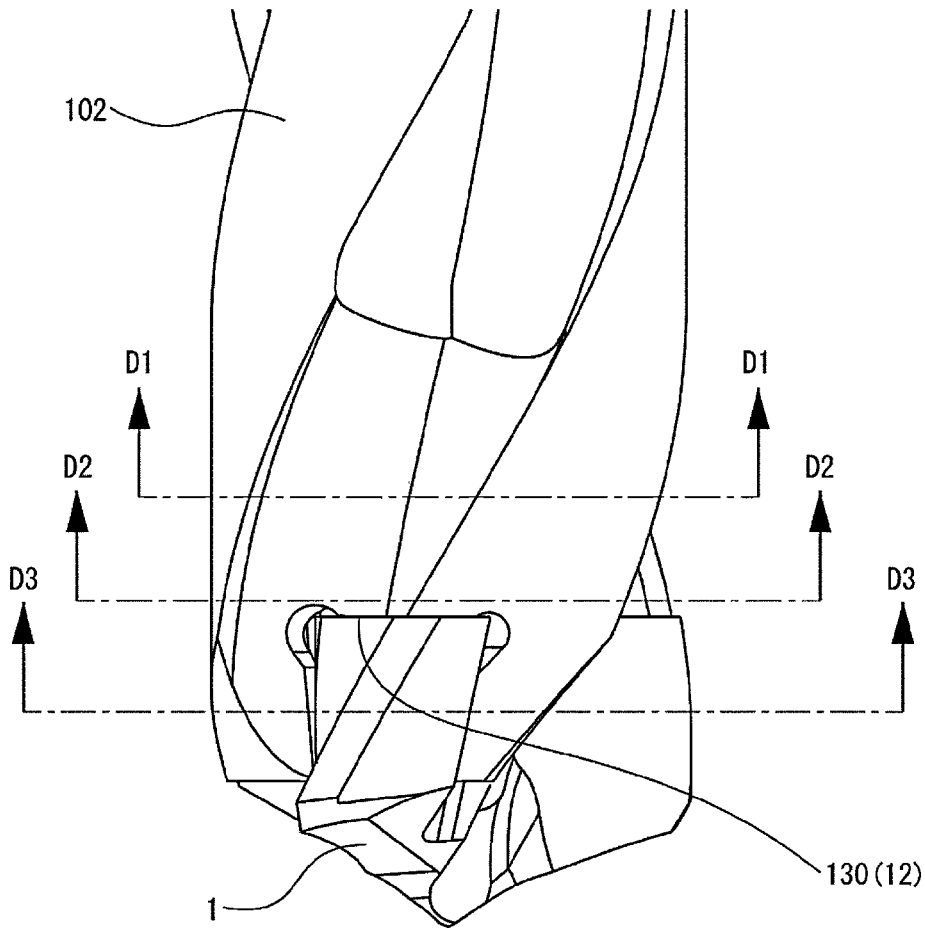
FIG. 13 is an enlarged view of a leading end portion located on a side of a first end of the rotary tool illustrated in FIG. 8.
Figure 14:
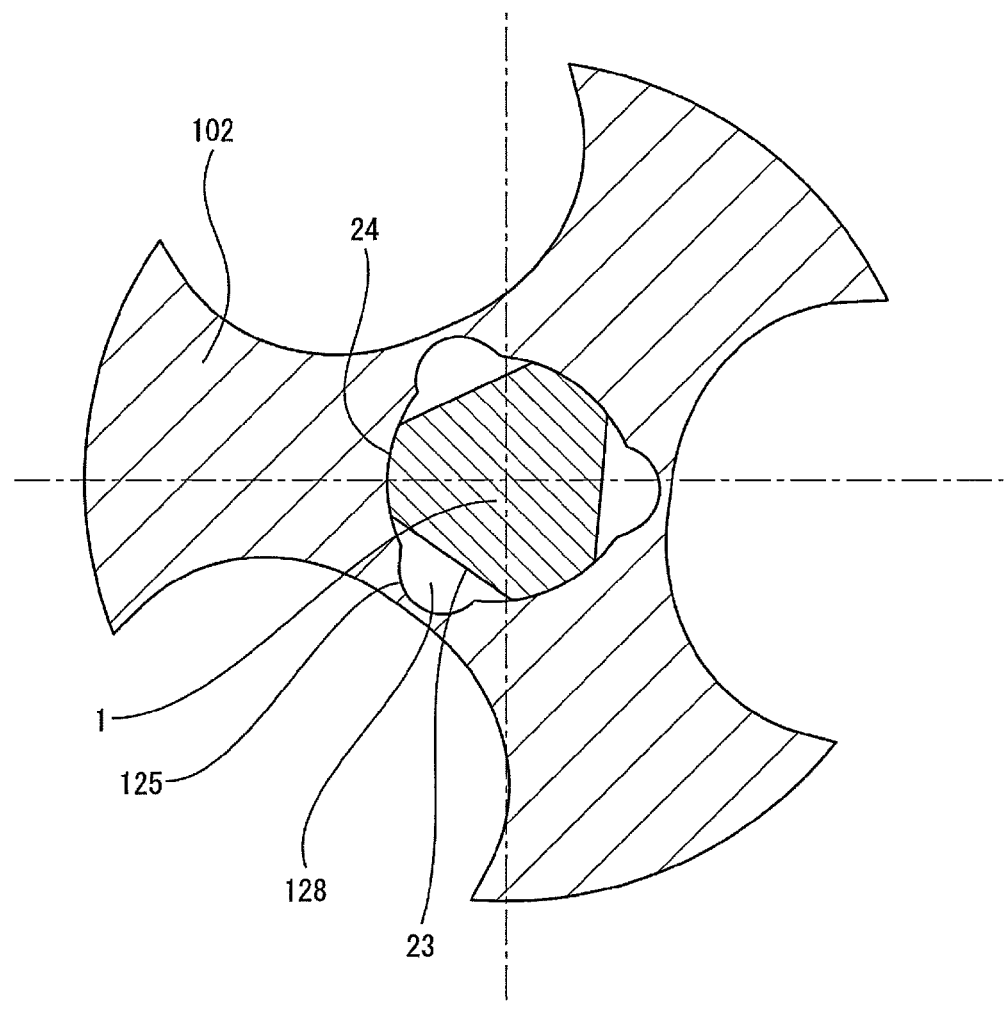
FIG. 14 is a cross-sectional view of the rotary tool illustrated in FIG. 8 taken along line D1-D1 in FIG. 13.
Figure 15:
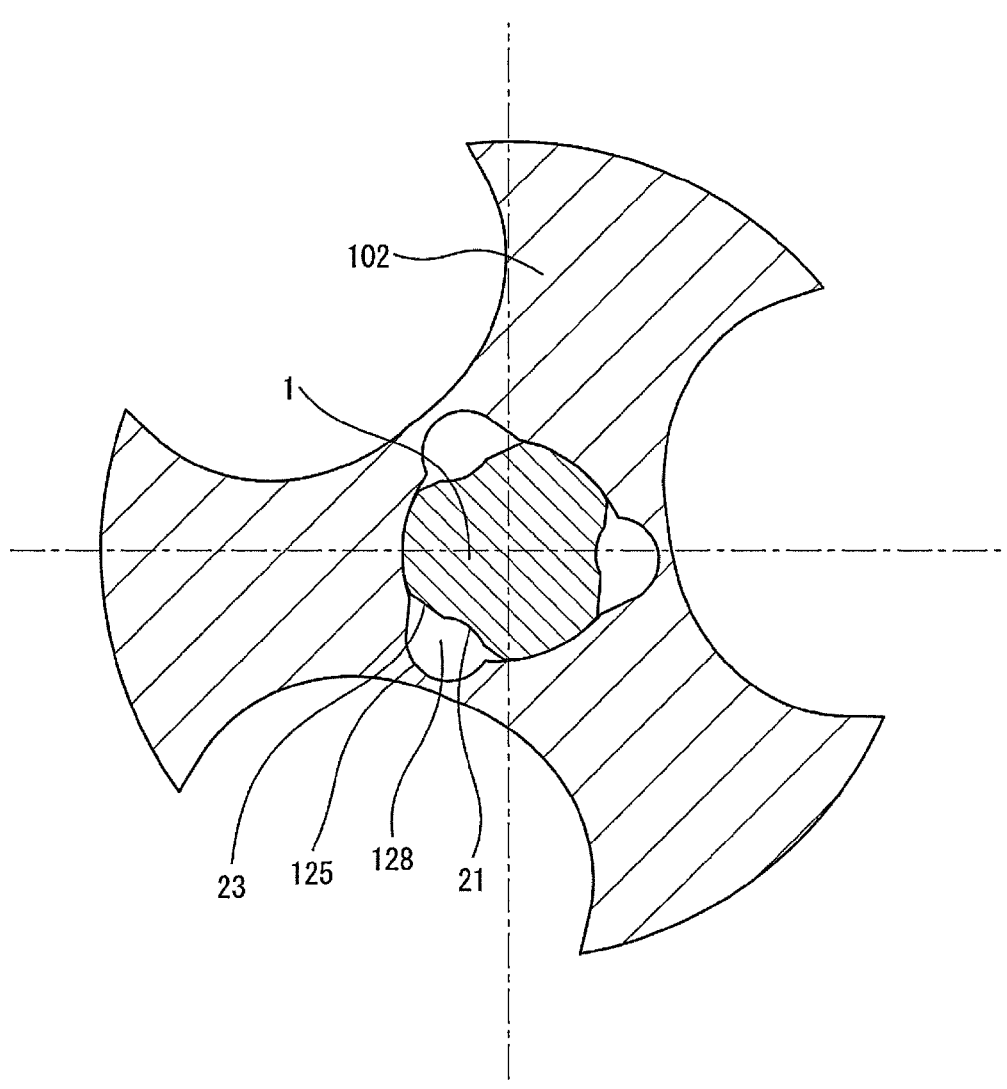
FIG. 15 is a cross-sectional view of the rotary tool illustrated in FIG. 8 taken along line D2-D2 in FIG. 13.
Figure 16:
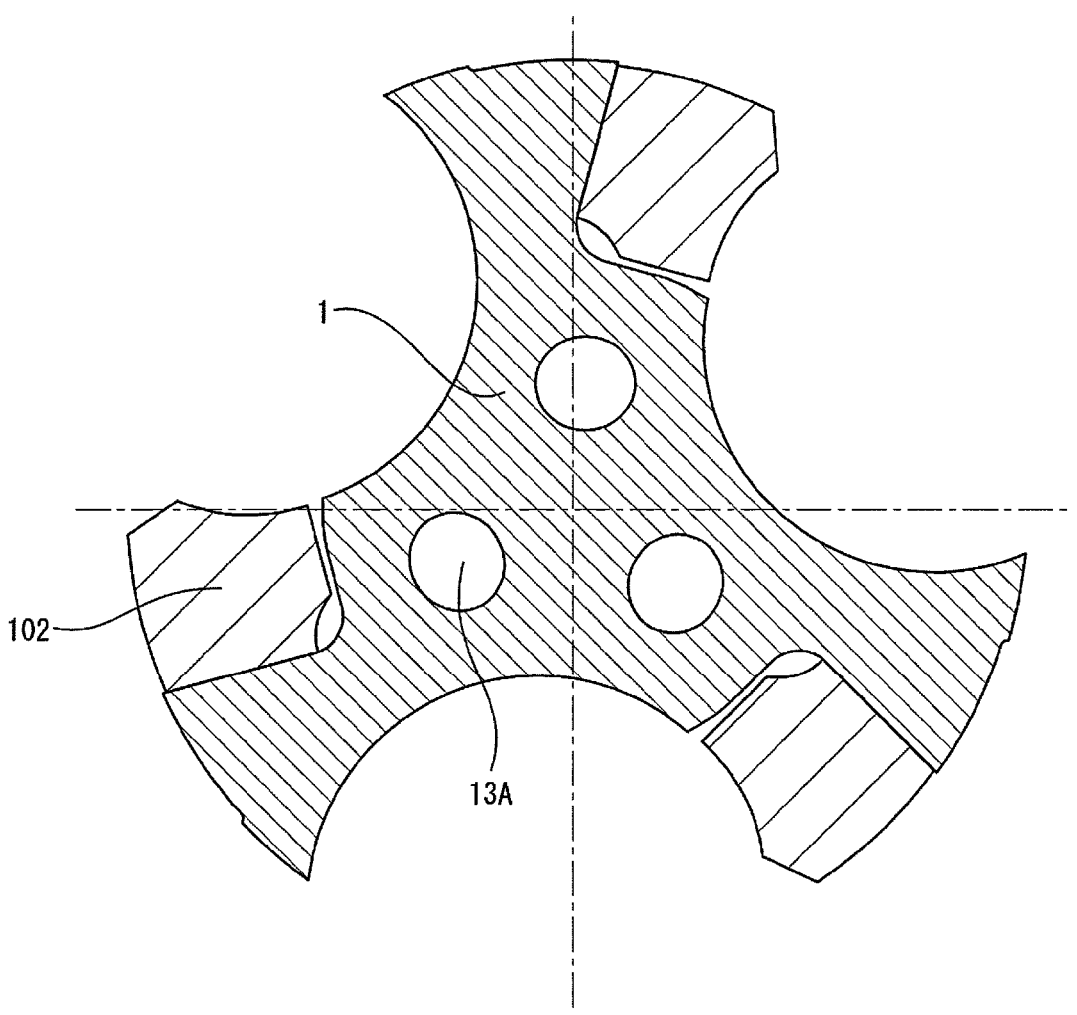
FIG. 16 is a cross-sectional view of the rotary tool illustrated in FIG. 8 taken along line D3-D3 in FIG. 13.

FIG. 8 is a side view of the rotary tool 100. FIG. 9 is a front view of the rotary tool 100 as viewed from the side of the first end 10A. FIG. 10 is a plan view of the rotary tool 100 as viewed in an A3 direction in FIG. 9. FIG. 11 is a side view of the rotary tool 100 as viewed in an A4 direction in FIG. 9. FIG. 12 is a perspective view of the holder 102. FIG. 13 is an enlarged view of a leading end portion of the rotary tool 100 located on the side of the first end 10A. FIG. 14 is a cross-sectional view of the rotary tool 100 taken along line D1-D1 in FIG. 13. FIG. 15 is a cross-sectional view of the rotary tool 100 taken along line D2-D2 in FIG. 13. FIG. 16 is a cross-sectional view of the rotary tool 100 taken along line D3-D3 in FIG. 13.

As illustrated in FIGS. 8 to 16, the rotary tool 100 of one example is a so-called insert-type drill, having the insert 1 and the holder 102 formed as separate members, and having the insert 1 attached to a leading end portion of the holder 102. The rotary tool 100 has the rotational axis X1, and rotates about the rotational axis X1.

While the rotary tool 100 of the present example is a single-chip type drill to which one insert 1 is attached, the rotary tool including the insert 1 is not limited to the single-chip type drill. The rotary tool is not limited to a drill that performs drilling by moving in the direction of the rotational axis X1 relative to the workpiece, and may be a tool that can rotate and cut the workpiece by moving in any direction while rotating. Examples of the rotary tool including the insert 1 include an endmill, and a milling tool.

The holder 102 may include a shank 103 and a body 104 extending along the rotational axis X1. The shank 103 may have a rod shape extending along the rotational axis X1, and is a portion held by a machine tool for example.

The body 104 has a side surface provided with a flute 110 for discharging chips from a workpiece T. The body 104 includes the pocket 120 opening on the leading end side. The shaft portion 20 of the insert 1 is attached to the pocket 120. The insert 1 may be secured to the holder 102 (body 104), for example, using a screw (not illustrated).

The end surface 130 at the leading end of the body 104 located on the side of the insert 1 comes into contact with the end surface 12 of the insert 1. The flute 110 is connected to the flute 80 of the insert 1.

The holder 102 includes a second through hole 150 extending along the rotational axis X1, in the shank 103 and the body 104. The second through hole 150 is a flow path for the coolant, and communicates with the pocket 120.

With the shaft portion 20 including the flow path surfaces 23, the rotary tool 100 has a gap between the shaft portion 20 and the inner circumference surface of the pocket 120 in a space of the pocket 120. Thus, the coolant that has reached the trailing end surface 22 of the shaft portion 20 through the second through hole 150 can flow to the second opening 15 through the gap.

The rotary tool 100 may include a second groove 125 having a curved surface recessed in a direction away from the rotational axis X1, in a portion of the inner circumference surface of the pocket 120 facing the flow path surface 23. The number of second grooves 125 provided may be the same as the number of flow path surfaces 23 in the shaft portion 20. The flow path surface 23 and the second groove 125 form a gap flow path 128 between the pocket 120 and the shaft portion 20. With the second groove 125 provided, the gap flow path 128 can have a large volume. A portion of the inner circumference surface of the pocket 120 other than the second groove 125 is in contact with the curved surface 24. Thus, the flow of the coolant in the gap flow path 128 can be facilitated, and the shaft portion attached to the pocket 120 can be stably fixed.

As illustrated in FIG. 15, the first groove 21 is formed on part of the flow path surface 23, and thus the gap flow path 128 can have an even larger area in plan view.

The coolant is supplied to the gap flow path 128 through the second through hole 150, passes through the gap flow path 128 to reach the second opening 15, and then passes through the first through hole 13 from the second opening 15 to be discharged from the first opening 14. The coolant discharged from the first opening 14 comes into contact with the cutting edge 11 to cool the cutting edge 11. Then, the coolant passes through the flutes 80 and the flute 110 to be discharged to the outside from a processed hole of the workpiece.

Method of Manufacturing Machined Product

Figure 17:
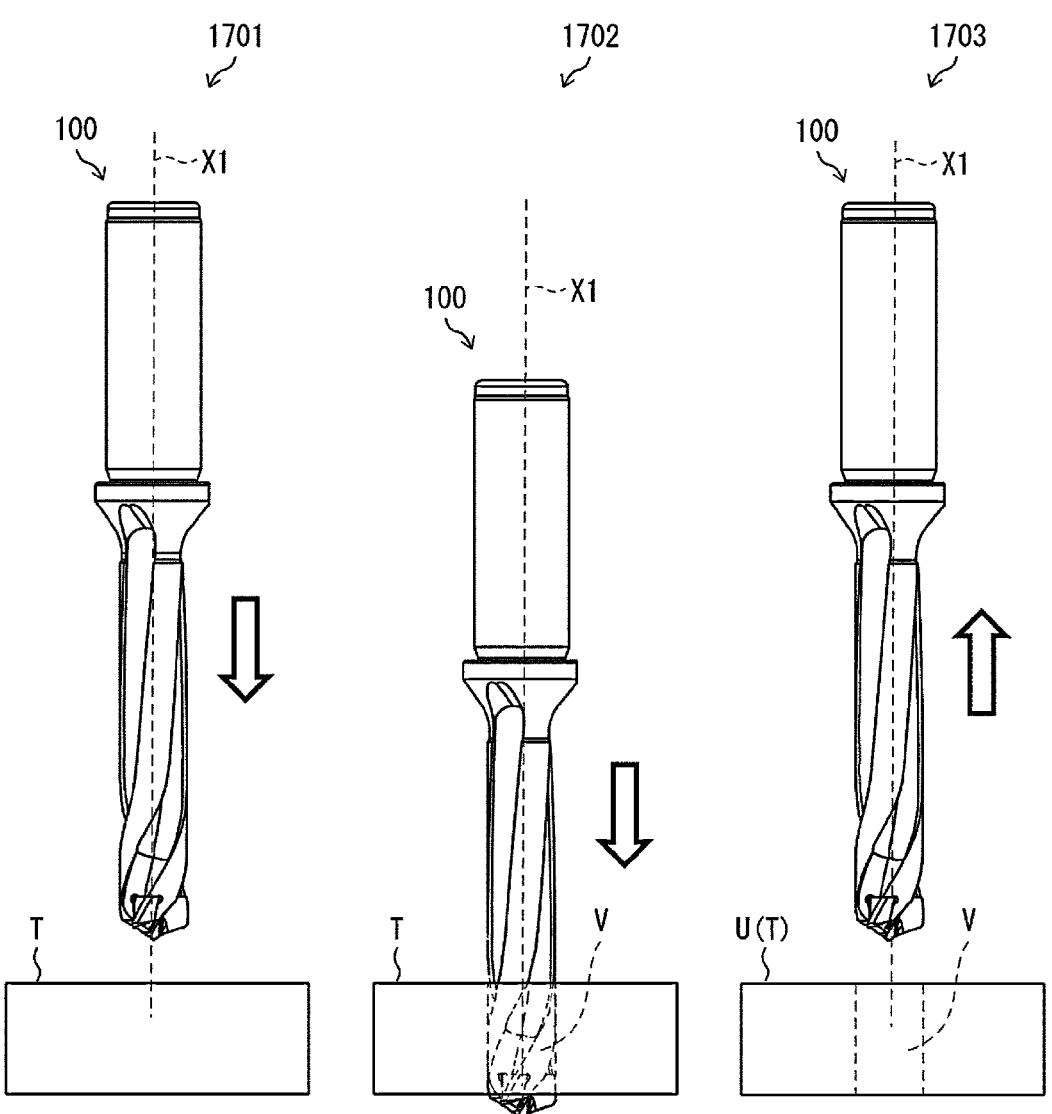
FIG. 17 is a schematic diagram illustrating an example of a process of a method for manufacturing a machined product of a non-limiting embodiment of the present disclosure.

Next, a description will be given on a method for manufacturing a machined product of a non-limiting embodiment of the present disclosure with reference to FIG. 17. FIG. 17 is a schematic diagram illustrating a process of a method for manufacturing a machined product of a non-limiting embodiment of the present disclosure. A method for manufacturing a machined product U by machining the workpiece T using the rotary tool 100 will be described below.

The method for manufacturing the machined product U according to the non-limiting embodiment of the present disclosure may include the following processes. Specifically, the steps may include:

(1) rotating the rotary tool 100;

(2) bringing the rotary tool 100 rotating into contact with the workpiece T; and (3) separating the rotary tool 100 from the workpiece T.

More specifically, first of all, as indicated by the reference numeral 1701 in FIG. 17, the workpiece T is prepared directly below the rotary tool 100, and the rotary tool 100 attached to the machine tool is rotated about the rotational axis X1. Examples of the workpiece T include aluminum, carbon steel, alloy steel, stainless steel, cast iron, and non-ferrous metals.

Then, as indicated by the reference numeral 1702 in FIG. 17, the rotary tool 100 and the workpiece T are moved toward each other, to bring the rotary tool 100 into contact with the workpiece T. Thus, the workpiece T is machined by the cutting edge 11 of the insert 1, whereby a processed hole V is formed. The chips from the workpiece T machined pass through the flute 110 of the holder 102 from the flutes 80 of the insert 1 to be discharged to the outside. The rotary tool 100 and the workpiece T may be relatively moved toward each other in any manner that is not particularly limited. For example, the rotary tool 100 may be moved toward the workpiece T fixed, or the workpiece T may be moved toward the rotating rotary tool 100 fixedly positioned.

Then, as indicated by the reference numeral 1703 in FIG. 17, the rotary tool 100 is separated from the workpiece T. As a result, the machined product U is manufactured as the workpiece T in which the processed hole V has been formed.

Variation

In the above embodiment, a description has been given on the rotary tool 100 of a so-called insert type configured as a combination between the insert 1 and the holder 102. However, the configuration of the rotary tool 100 is not limited to this, and may be a so-called solid type rotary tool in which, for example, the insert 1 and the holder 102 are integrally formed.

Supplementary Note

In the present disclosure, the invention has been described above based on the various drawings and examples. However, the invention according to the present disclosure is not limited to each embodiment described above. That is, the embodiments of the invention according to the present disclosure can be modified in various ways within the scope illustrated in the present disclosure, and embodiments obtained by appropriately combining the technical means disclosed in different embodiments are also included in the technical scope of the invention according to the present disclosure. In other words, note that a person skilled in the art can easily make various variations or modifications based on the present disclosure. Note that these variations or modifications are included within the scope of the present disclosure.

REFERENCE SIGNS

1 Insert (cutting insert)
10 Cutting portion
10A First end
11, 11A, 11B, 11C Cutting edge
12, 130 End surface
13, 13A to 13C First through hole
14, 14A to 14C First opening
15, 15A to 15C Second opening
16A Chisel edge
17A Thinning edge
18, 18A to 18C Main cutting edge
20 Shaft portion
20A Second end
21 First groove
70A Thinning surface
80, 80A to 80C, 110 flute
81A to 81C Ridge
100 Rotary tool
102 Holder
125 Second groove
150 Second through hole
X1 Rotational axis
X2 Arrow (rotational direction)

The invention claimed is:

1. A cutting insert, comprising:
a cutting portion that is located on a side of a first end of the cutting insert; and
a shaft portion that is located on a side of a second end of the cutting insert, wherein
the cutting insert extends from the first end to the second end along a rotational axis, and
the cutting portion comprises
a cutting edge that is located on the side of the first end,
an end surface located on a side of the shaft portion, and
a first through hole extending from the end surface toward the first end,
the shaft portion extends from the end surface to the second end,
the first through hole comprises
a first opening that is located on the side of the first end, and
a second opening that is located on the side of the shaft portion, and
the first opening is positioned in a rear of the second opening in a rotational direction of the rotational axis.

2. The cutting insert according to claim 1, wherein the shaft portion comprises a first groove extending from the first through hole toward the second end.

3. The cutting insert according to claim 1, wherein the cutting edge comprises
   a chisel edge extending from the rotational axis toward an outer circumference,
   a thinning edge extending from the chisel edge toward the outer circumference, and
   a main cutting edge extending from the thinning edge toward the outer circumference,
   the cutting portion further comprises a thinning surface extending from the thinning edge toward the second end, and
   the first opening is positioned on the thinning surface.

4. The cutting insert according to claim 3, wherein the cutting portion further comprises a flute extending from the main cutting edge toward the second end, and the second opening is positioned away from the flute.

5. The cutting insert according to claim 1, wherein the first opening is positioned farther from the rotational axis than the second opening is in a front view from the side of the first end.

6. The cutting insert according to claim 1, wherein the rotational direction of the rotational axis is a counterclockwise direction in a front view of the cutting insert from the side of the first end.

7. The cutting insert according to claim 6, wherein the cutting insert comprises a further first through hole,
   the first through hole and the further first through hole are rotationally symmetrical with respect to the rotational axis,
   the further first through hole has a further first opening located on the side of the first end and a further second opening located on the side of the shaft portion, and
   the first opening of the first through hole at least partially overlaps the further second opening of the further first through hole in the front view of the cutting insert from the side of the first end.

8. A rotary tool, comprising:
   a cutting insert; and
   a holder, wherein
   the cutting insert includes:
      a cutting portion that is located on a side of a first end of the cutting insert; and
      a shaft portion that is located on a side of a second end of the cutting insert,
   the cutting insert extends from the first end to the second end along a rotational axis,
   the cutting portion includes:
      a cutting edge that is located on the side of the first end,
      an end surface located on a side of the shaft portion, and
      a first through hole extending from the end surface toward the first end,
   the shaft portion extends from the end surface to the second end,
   the first through hole includes:
      a first opening that is located on the side of the first end, and
      a second opening that is located on the side of the shaft portion,
   the first opening is positioned in a rear of the second opening in a rotational direction of the rotational axis,
   the holder includes:
      a shank having a rod shape extending along the rotational axis, and
      a body extending along the rotational axis, the body includes a pocket that opens at a leading end of the body, and
   the cutting insert is configured to be attached to the pocket.

9. The rotary tool according to claim 8, wherein the holder comprises
   a second through hole extending along the rotational axis in the shank and the body, and
   a second groove recessed from an inner circumference surface of the pocket in a direction away from the rotational axis, the second groove being connected to the first through hole of the cutting insert and the second through hole of the holder.

10. The rotary tool according to claim 9, wherein the shaft portion comprises a first groove extending from the first through hole toward the second end, and the second groove faces the first groove.

11. A method of manufacturing a machined product, the method comprising:
   rotating the rotary tool according to claim 10;
   bringing the rotary tool into contact with a workpiece; and
   separating the rotary tool from the workpiece.

12. The rotary tool according to claim 9, wherein the shaft portion of the cutting insert includes a flow path surface extending in a direction toward the second end from the second opening.

13. The rotary tool according to claim 12, wherein the flow path surface of the cutting insert and the second groove of the holder are configured to form a gap flow path between the pocket and the shaft portion.

14. A rotary tool, comprising:
   a holder; and
   a cutting insert extending from a first end to a second end along a rotational axis, wherein
   the holder comprises
      a shank having a rod shape extending along the rotational axis, and
      a body extending along the rotational axis,
   the body comprises a first end surface at a leading end of the body, wherein a pocket is opening on the first end surface,
   the cutting insert is configured to be attached to the pocket,
   the cutting insert comprises
      a cutting portion that is located on a side of the first end of the cutting insert, and
      a shaft portion that is located on a side of the second end of the cutting insert,
   the cutting portion comprises
      a cutting edge that is located on the side of the first end,
      a second end surface configured to be in contact with the first end surface of the body, and
      a first through hole extending from the second end surface toward the first end,
   the shaft portion extends from the first end surface to the second end,
   the first through hole comprises
      a first opening that is located on the side of the first end, and
      a second opening that is located on the side of the shaft portion, and
   the first opening is positioned in a rear of the second opening in a rotational direction of the rotational axis.

* * * * *